(12) United States Patent
Moulsley et al.

(10) Patent No.: US 8,902,824 B2
(45) Date of Patent: Dec. 2, 2014

(54) METHODS OF TRANSMITTING AND RECEIVING DATA, AND APPARATUS THEREFOR

(75) Inventors: Timothy J. Moulsley, Caterham (GB); Filippo Tosato, Redhill (GB); Matthew P. J. Baker, Canterbury (GB)

(73) Assignees: Koninklijke Philips N.V., Eindhoven (NL); Sharp Corporation, Osaka (JP)

( * ) Notice: Subject to any disclaimer, the term of this patent is extended or adjusted under 35 U.S.C. 154(b) by 1231 days.

(21) Appl. No.: 12/438,188

(22) PCT Filed: Aug. 20, 2007

(86) PCT No.: PCT/IB2007/053315
§ 371 (c)(1),
(2), (4) Date: Feb. 20, 2009

(87) PCT Pub. No.: WO2008/023324
PCT Pub. Date: Feb. 28, 2008

(65) Prior Publication Data
US 2009/0312018 A1      Dec. 17, 2009

(30) Foreign Application Priority Data
Aug. 22, 2006    (EP) .................................... 06119341

(51) Int. Cl.
*H04W 4/00*        (2009.01)
*H04W 74/08*       (2009.01)
*H04B 7/04*        (2006.01)

(52) U.S. Cl.
CPC ............ *H04B 7/04* (2013.01); *H04W 74/0833* (2013.01)
USPC ...................................... 370/329; 455/435.1

(58) Field of Classification Search
USPC ........................................ 370/329; 455/435.1
See application file for complete search history.

(56) References Cited

U.S. PATENT DOCUMENTS

| 6,810,258 | B1 | | 10/2004 | Vialen | |
| 6,879,832 | B1 | * | 4/2005 | Muller et al. .................. | 455/445 |
| 7,706,824 | B2 | * | 4/2010 | Schulist et al. ............... | 455/517 |
| 8,081,587 | B2 | * | 12/2011 | Beckmann et al. ........... | 370/310 |
| 8,509,801 | B1 | * | 8/2013 | Wang et al. .................... | 455/453 |
| 2002/0025812 | A1 | | 2/2002 | Ahlstrand et al. | |
| 2002/0173302 | A1 | * | 11/2002 | Baker et al. .................... | 455/422 |
| 2004/0204101 | A1 | | 10/2004 | Qiu | |
| 2004/0233870 | A1 | | 11/2004 | Willenegger et al. | |
| 2005/0047366 | A1 | * | 3/2005 | Ghosh et al. .................. | 370/329 |

FOREIGN PATENT DOCUMENTS

| EP | 1744577 A1 | 1/2007 |
| JP | 2004320165 A | 11/2004 |
| WO | WO 2004100394 A1 * | 11/2004 |
| WO | 2005122616 A1 | 12/2005 |

* cited by examiner

*Primary Examiner* — Christopher M Brandt

(57) ABSTRACT

Data is transmitted from a radio communication device by selecting a signal dependent on data to be transmitted, transmitting to a radio communication station the selected signal as a random access transmission, deriving an identifier dependent on the data, and employing the identifier to identify a subsequently received signal intended for the radio communication device The data is received at a radio communication station by receiving the random access signal which is indicative of the data to be received, determining the data indicated by the random access signal, deriving an identifier dependent on the determined data, and including the identifier in a subsequent transmission from the radio communication station to identify the intended recipient of the subsequent transmission.

28 Claims, 2 Drawing Sheets

10  Signal selection stage
20  Transmitter
30  Identifier derivation stage
40  Decoder
50  Encoder
60  Validity store
70  Data store
80  Receiver Radio communication device device (100)

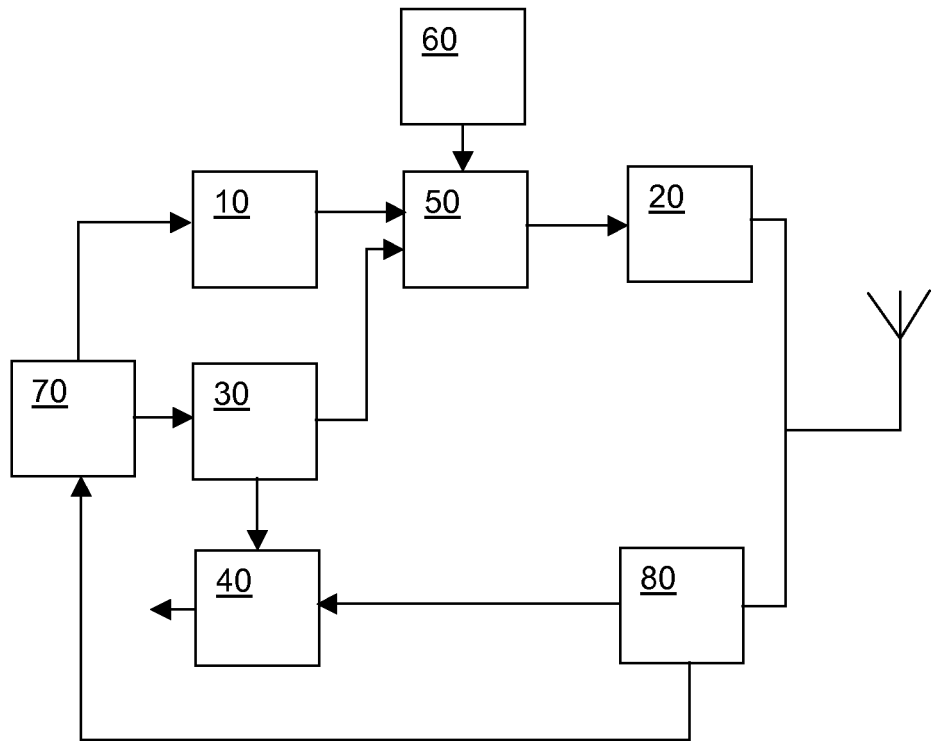
| 10 | Signal selection stage |
| 20 | Transmitter |
| 30 | Identifier derivation stage |
| 40 | Decoder |
| 50 | Encoder |
| 60 | Validity store |
| 70 | Data store |
| 80 | Receiver |
Fig. 1 Radio communication device device (100)

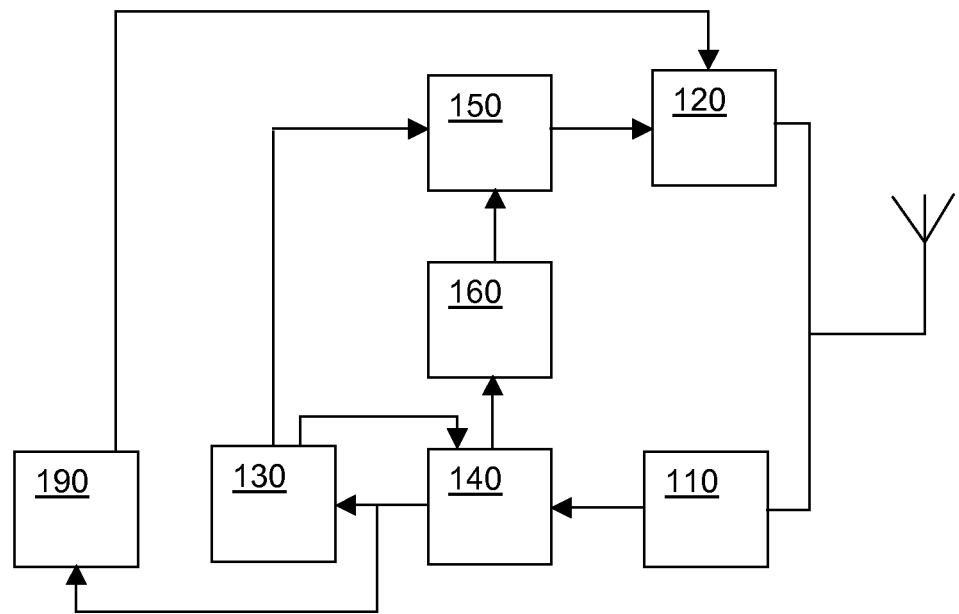
| 110 | Receiver |
| --- | --- |
| 120 | Transmitter |
| 130 | Identifier derivation stage |
| 140 | Decoder |
| 150 | Encoder |
| 160 | Parameter store |
| 190 | Transmission parameter derivation stage |
Fig. 2  Radio communication station (200)

METHODS OF TRANSMITTING AND RECEIVING DATA, AND APPARATUS THEREFOR

TECHNICAL FIELD

The invention relates to a radio communication apparatus and to a method of operating a radio communication apparatus. The invention also relates to a radio communication system comprising the apparatus and to a method of operating the radio communication system. The invention has application in, for example but not exclusively, mobile communication systems.

BACKGROUND ART

Mobile communication systems require a random access mechanism by which mobile terminals can access a network. In one example of a random access mechanism which is under consideration for the UMTS LTE (Universal Mobile Telecommunication System Long Term Evolution) a mobile terminal transmits a signature on an asynchronous random access channel (RACH). The mobile terminal selects a particular signature from a larger set (e.g. of 64), which enables a few bits (e.g. 6) of information to be conveyed. One requirement is that the collision probability (i.e. probability that two mobile terminals use the same signature at the same time) should be sufficiently low. A further requirement is that the resulting waveforms have low cross-correlation.

The bit pattern defining the signature can be considered in terms of one or more data fields. Some examples of the potential contents of the data fields are:
  Pseudo-random data (in the form of a temporary mobile terminal identity to reduce the risk of collision)
  Channel quality indicator (CQI) or pathloss measurement
  Reason for RACH access.
The CQI and Reason fields may also help to reduce collisions if they are sufficiently uncorrected between terminals.

Following the detection of the signature by the network, or more specifically the access point, further signalling takes place in both uplink (mobile terminal to network) and downlink (network to mobile terminal), for example to allocate resources for data transmission.

The access point needs channel state information in order to choose transmission characteristics (e.g. rate, power, beamforming, pre-coding) in order to maximize the efficiency of the downlink transmissions in the final stages of the random access process, and later. The example mechanism described provides only a small number of useful data bits which can be sent in the first transmission, and so the channel cannot be described very accurately. It is also desirable to minimise the potential collision probability.

DISCLOSURE OF INVENTION

An object of the invention is to enable an improved random access mechanism.

According to a first aspect of the invention there is provided a method of transmitting data from a radio communication device, comprising:
  selecting a signal dependent on data to be transmitted;
  transmitting to a radio communication station the selected signal as a first random access transmission;
  deriving an identifier dependent on the data; and
  employing the identifier to identify a subsequently received signal intended for the radio communication device.

According to a second aspect of the invention there is provided a method of receiving data at a radio communication station, comprising:
  receiving from a radio communication device a first random access signal indicative of data to be received;
  determining the data indicated by the first random access signal;
  deriving an identifier dependent on the determined data;
  including the identifier in a subsequent transmission from the radio communication station to identify the radio communication device as the intended recipient of the subsequent transmission.
Additional steps may be:
  deriving a transmission parameter dependent on the determined data; and
  employing the derived transmission parameter for a transmission to the radio communication device.

The invention also provides a method of operating a communication system comprising operating a radio communication device in accordance with the first aspect of the invention and operating a radio communication station in accordance with the second aspect of the invention.

According to a third aspect of the invention there is provided a radio communication device for transmitting data, comprising:
  means adapted to select a signal dependent on data to be transmitted;
  means adapted to transmit to a radio communication station the selected signal as a first random access transmission;
  means adapted to derive an identifier dependent on the data; and
  means adapted to employ the identifier to identify a subsequently received signal intended for the radio communication device.

According to a fourth aspect of the invention there is provided a radio communication station for receiving data, comprising:
  means adapted to receive from a radio communication device a first random access signal indicative of data to be received;
  means adapted to determine the data indicated by the first random access signal;
  means adapted to derive an identifier dependent on the determined data;
  means adapted to include the identifier in a subsequent transmission from the radio communication station to identify the radio communication device as the intended recipient of the subsequent transmission.
Additional features may be:
  means adapted to derive a transmission parameter dependent on the determined data; and
  means adapted to employ the derived transmission parameter for a transmission to the radio communication device.

The invention also provides a communication system comprising a radio communication device in accordance with the third aspect of the invention and a radio communication station in accordance with the fourth aspect of the invention.

Thus the invention involves a radio communication device (e.g. mobile terminal) assuming a temporary identifier which is linked to, or at least partly derived from, data. The radio communication device transmits the identifier and the data by selecting a signal according to the data. The radio communication station (e.g. base station or other network apparatus) receives the signal, determines the data from the signal, and determines the identifier from the data. The use of an identifier derived from the data avoids any need to transmit an explicit further indication of the identifier; the data conveys the identifier implicitly. In this way system efficiency can be improved.

An indication of the identifier may be included in a subsequent transmission from the radio communication device for identifying the source of transmission, enabling the radio communication station to identify the source of the subsequent transmission, and an indication of the identifier may be included in a subsequent transmission from the radio communication station to identify the destination of the transmission. Such a subsequent transmission from the radio communication device may be a random access transmission. Such subsequent use of the temporary identifier enables communication to proceed without requiring additional signalling to establish a predetermined identifier of the radio communication device. In this way system efficiency can be further improved.

The data may comprise an indication of at least one of:
signal quality of a received signal;
signal quality of a plurality of frequencies or frequency bands;
signal quality for a plurality of antennas;
a channel transfer function;
number of receive antennas available at the radio communication apparatus;
a (pre-assigned) identifier of a selected radio communication station to which the random access transmission is directed;
a pre-coding matrix;
number of spatial streams supportable by the radio communication device;
location of the radio communication device;
angle of a propagation path from the radio communication device to a radio communication station to which the random access transmission is directed;
angular spread or uncertainty of the angle of a propagation path from the radio communication device to a radio communication station to which the random access transmission is directed;
number of previous transmissions of the random access transmission;
requested data rate.

The random access transmissions from the radio communication device may include an indication of the validity of a stored parameter held by the radio communication station and relating to the radio communication device. In response to receiving this indication, the radio communication station may control subsequent communication with the radio communication device dependent on the stored parameter, for example it may derive a transmission parameter dependent on the stored parameter. This feature can enable the radio communication station to re-use information that it has stored relating to the radio communication device, thereby avoiding any need to reacquire such information, and avoiding any need for the radio communication device to retransmit information that the radio communication station already holds which is currently valid.

For example, the indication of validity may take the form of a flag (e.g. a single bit) to indicate one or more of the following:
whether previously transmitted data (e.g. relating to channel quality) remains valid;
whether the identifier is currently known and associated with the radio communication device in the radio communication station (e.g. base station or other network device);
whether a further identifier, for example relating to a higher layer protocol, is currently assigned to the radio communication device and associated with the identifier;
whether other parameters related to the radiocommunication device are currently known to the radio communication station and associated with the identifier, such as radio transmission or reception capability, a supported or active application or data rate, a number of antennas, a quality of service level, a latency requirement, or a resource allocation requirement.

Correspondingly, the stored parameter held by the radio communication station may be:
a further identifier, for example relating to a higher layer protocol;
a radio transmission or reception capability;
supported or active application or data rate;
number of antennas;
quality of service level;
latency requirement;
or a resource allocation requirement.

BRIEF DESCRIPTION OF DRAWINGS

The invention will now be described, by way of example only, with reference to the accompanying drawings wherein:

FIG. 1 is a block schematic diagram of a radio communication device for transmitting data; and FIG. 2 is a block schematic diagram of a radio communication station for receiving data.

MODES FOR CARRYING OUT THE INVENTION

Embodiments of the invention will be described with reference to a mobile communication system in which the radio communication device 100 of FIG. 1 is a mobile terminal, such as a mobile phone, and the radio communication station 200 of FIG. 2 is a base station, or access point, in a network.

According to the invention a mobile terminal 100 assumes a temporary identity which may be linked to, or at least partly derived from, channel state or other information about the mobile terminal or network. Then this identity is transmitted by selecting a signature signal according to the identity by means of a signal selection stage 10.

This means that when a particular signature is received by the receiver 110 of the access point 200, the temporary identity can be determined by an identifier derivation stage 130 and the associated values of channel state or other parameters established. These can then be used to derive suitable parameters for subsequent downlink transmissions when stored in a parameter store 160.

For mobile terminals with no previous or recent connection to the network, the mobile terminal may derive its own temporary identity based on a suitable procedure with help of an identifier derivation stage 30. For example, taking the most significant bits of quantised channel state parameters, and optionally adding some more bits to distinguish between mobile terminals with similar channel states.

Despite the selection of the signature signal, there is still a possibility of a collision, i.e. the access point receives two identical signatures from different radio communication devices. Therefore some additional steps in the procedure may be added to enable collision resolution. Such steps are well known in the art and are not described herein.

When the mobile terminal 100 has established a connection to the access point 200, a temporary identity may be assigned by the network at some convenient time. This temporary identity is retained by the mobile terminal 100 in a data store 70 for potential later use. Preferably this identity would be compatible with the identity used for first access, which was based on channel state information or other type of data. One way of doing this is to make part of the identity based on the same channel state information, or other type of data, but as known or determined at the access point. A second part of the identity may consist of randomly generated additional bits to avoid the possibility of two mobile terminals having the same identity.

An example embodiment of the invention applied to UMTS LTE is as follows. Using UMTS terminology, a mobile terminal 100 is termed a User Equipment (UE) and a base station 200 is termed a Node B. We assume that a set of 64 signatures is assigned to the Node B 200 with which the UE 100 is attempting to communicate. In the example, the access point has multiple transmit antennas (e.g. 4 in a linear array), each transmitting orthogonal pilot sequences. The UE 100 selects one of these signatures based on a six bit temporary identity by means of its signal selection stage 10.

For the case of a UE with no previous or recent connection to the network the identity is derived as follows. Three most significant bits are obtained by measuring the angle to the access point with respect to a reference direction. This may be determined by measurement at the UE 100 of pilot transmissions from each of the antennas at the access point. This information enables design of a transmitter beamformer. Three least significant bits are derived from downlink channel quality information, based on expected SNR (signal to noise ratio) or SIR (signal to interference ratio) determined by measuring downlink pilots. Since the channel quality information depends approximately on distance from the access point the combined information represents a crude measurement of UE location.

When the receiver 110 of the access point 200 receives the signature, then subsequent downlink transmissions, for example to allocate resources for further uplink transmissions, can be made using a power, data rate and beamforming pattern which are appropriate for the UE channel, based on the values of angle and channel quality information determined from the signature.

In a further embodiment, if the angle to the UE 100 can be determined by the access point 200 by making measurements on the uplink (i.e. from the RACH signature), for instance by means of a transmission parameter derivation stage 190, then it may not be necessary to transmit the angle in the uplink signature. In this case the angle information described above may be replaced by another parameter such as the angular uncertainty or angular spread. This enables the design of a robust beamformer for subsequent downlink transmissions.

In a time division duplex (TDD) system, reciprocity may be exploited, so that measurements of channel parameters may be made at either receiver. It may be assumed that the instantaneous channel state is similar for uplink and downlink.

In the case of frequency division duplex (FDD) operation, the uplink and downlink are at different frequencies, so instantaneous channel states are likely to be different. However, channel statistics may be similar. This means that an average in time or frequency domain is required for FDD operation. A wide signal bandwidth would allow frequency domain averaging, and this may be more suitable for the case of RACH access.

The invention can be applied to different channel state metrics. For example:

Channel transfer function
CQI for more than one frequency or frequency band
CQI for more than one antenna
Average CQI for more than one antenna
Different CQI between antennas
Preferred pre-coding matrix
Preferred pre-coding vector
Channel rank (number of supported spatial streams)
Location of the UE
Angle of the path from the UE to the access point
Angular spread or uncertainty
Number of receiver antennas available In the case where a temporary UE identity is derived from the channel state information, this will only be useful for further RACH access attempts as long as the channel state does not change significantly, or as long as another means for indicating channel state information has not been established. This is because channel state information embedded in the identity could be used by the access point. Therefore some means of updating the UE identity may be provided, such as signalling to request a change. This could be done for example by a validity store 60 indicating the validity of a stored parameter. Alternatively a new identity can be created for a new RACH access when necessary. Subsequent signalling may delete the old one.

Alternatively or additionally a flag, for example a single bit, could indicate whether the RACH access is using a new identity, for which the channel state information is valid, but the identity of the UE is not known to the access point, or an old identity, where the identity of the UE is also known to the access point.

Alternatively a single bit flag may indicate whether the channel state information in the identity is valid or not.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication and which may be used instead of or in addition to features already described herein.

INDUSTRIAL APPLICABILITY

Wireless communication systems, for example UMTS LTE or other cellular systems such as UMTS WCDMA (Wideband Code Division Multiple Access).

The invention claimed is:

1. A method of transmitting data, the method comprising acts of:
   a radio communication device
      assuming an identifier linked to at least one category of a plurality of categories of data,
      selecting a signal dependent on the at least one category of data, and
      transmitting to a radio communication station the selected signal using a random access transmission;
   the radio communication station deriving the identifier linked to the at least one category of data; and
   including an indication of the identifier in a subsequent transmission from the radio communication station to identify the destination of transmission, and from the radio communication device to identify the source of transmission.

2. The method of transmitting data as claimed in claim 1, comprising an act of including an indication of the identifier in a subsequent transmission from the radio communication device for identifying the source of transmission.

3. The method of transmitting data as claimed in claim 2, wherein the subsequent transmission is a random access transmission.

4. The method of transmitting data as claimed in claim 1, wherein the plurality of categories of data comprises at least one of signal quality of a received signal, signal quality of a plurality of frequencies or frequency bands, signal quality for a plurality of antennas, a channel transfer function, number of receive antennas available at the radio communication device, an identifier of a selected radio communication station to which the random access transmission is directed, a pre-coding matrix, number of spatial streams supportable by the radio communication device, location of the radio communication device, angle of a propagation path from the radio communication device to a radio communication station to which the random access transmission is directed, angular spread or uncertainty of the angle of a propagation path from the radio communication device to a radio communication station to which the random access transmission is directed, number of previous transmissions of the random access transmission, requested data rate.

5. The method of transmitting data as claimed in claim 1, wherein the random access transmission includes an indication of the validity of a stored parameter held by the radio communication station and relating to the radio communication device.

6. A method of receiving data, the method comprising acts of:
 a radio communication station
  receiving from a radio communication device a random access signal indicative of an identifier linked to at least one category of a plurality of categories of data to be received, the identifier is assumed by a radio communication device transmitting the signal;
  deriving the identifier linked to the at least one category of data;
  including an indication of the identifier in a subsequent transmission from the radio communication station to identify the destination of transmission, and from the radio communication device to identify the source of transmission.

7. The method of receiving data as claimed in claim 6, comprising acts of:
 deriving a transmission parameter dependent on the at least one category of data; and
 employing the derived transmission parameter for transmitting.

8. The method of receiving data as claimed in claim 6, comprising an act of employing the identifier to identify the source of a subsequently received signal.

9. The method of receiving data as claimed in claim 8, wherein the subsequently received signal is a random access signal.

10. The method of receiving data as claimed in claim 6, wherein the plurality of categories of data comprises at least one of signal quality of a received signal, signal quality of a plurality of frequencies or frequency bands, signal quality for a plurality of antennas, a channel transfer function, number of receive antennas available at the radio communication device, an identifier of a selected radio communication station to which the random access transmission is directed, a pre-coding matrix, number of spatial streams supportable by the radio communication device location of the radio communication device, angle of a propagation path from the radio communication device to a radio communication station to which the random access transmission is directed, angular spread or uncertainty of the angle of a propagation path from the radio communication device to a radio communication station to which the random access transmission is directed, number of previous transmissions of the random access transmission, requested data rate.

11. The method of receiving data as claimed in claim 6, wherein the random access transmission includes an indication of the validity of a stored parameter held by the radio communication station and relating to the radio communication device, the method further comprising an act of in response to the indication of the identifier, controlling subsequent communication with the radio communication device dependent on the stored parameter.

12. The method of receiving data as claimed in claim 11, wherein controlling the subsequent communication comprises deriving the transmission parameter dependent on the stored parameter.

13. The method of receiving data as claimed in claim 11, wherein the stored parameter is at least one of: a further identifier; a radio transmission or reception capability; a supported application; a supported data rate; a number of antennas; a quality of service level; a latency requirement; a resource allocation requirement.

14. A method of operating a radio communication system, the method comprising acts of:
 operating a radio communication device for
  assuming an identifier linked to at least one category of a plurality of categories of data,
  selecting a signal dependent on the at least one category of data, and
  transmitting to a radio communication station the selected signal using a random access transmission;
 operating a radio communication station for
  deriving the identifier linked to the at least one category of data, and
  including an indication of the identifier in a subsequent transmission to identify the radio communication device of destination.

15. A radio communication device for transmitting data, the device comprising:
 a processor for assuming an identifier linked to at least one category of a plurality of categories of data;
 a selector to select a signal dependent on the at least one category of data;
 a transmitter to transmit to a radio communication station the selected signal using random access transmission;
 a receiver to receive the identifier linked to the at least one category of data derived on a radio communication station, and to employ the identifier to identify a subsequently received signal intended for the radio communication device.

16. The radio communication device as claimed in claim 15, wherein the transmitter is adapted to include an indication of the identifier in a subsequent transmission to the radio communication station for identifying the source of transmission.

17. The radio communication device as claimed in claim 16, wherein the subsequent transmission is a random access transmission.

18. The radio communication device as claimed in claim 15, wherein the plurality of categories of data comprises at least one of: signal quality of a received signal, signal quality of a plurality of frequencies or frequency bands, signal quality for a plurality of antennas, a channel transfer function, number of receive antennas available at the radio communication device, an identifier of a selected radio communication station to which the random access transmission is directed, a pre-coding matrix, number of spatial streams supportable by the radio communication device, location of the radio communication device, angle of a propagation path from the radio communication device to a radio communication station to which the random access transmission is directed, angular spread or uncertainty of the angle of a propagation path from the radio communication device to a radio communication station to which the random access transmission is directed, number of previous transmissions of the random access transmission, requested data rate.

19. The radio communication device as claimed in claim 15, wherein the transmitter is adapted to include in the random access transmission an indication of the validity of a stored parameter held by the radio communication station and relating to the radio communication device.

20. A radio communication station for receiving data, comprising:
   a receiver to receive from a radio communication device a random access signal indicative of an identifier linked to at least one category of a plurality of categories of data to be received, the identifier is assumed by a radio communication device transmitting the signal;
   a processor to derive the identifier linked to the at least one category of data; and
   a transmitter to include an indication of the identifier in a subsequent transmission from the radio communication station to identify the destination of transmission, and from the radio communication device to identify the source of transmission.

21. The radio communication station as claimed in claim 20,
   wherein the transmitter is further adapted to derive a transmission parameter dependent on the determined data; and
   to employ the derived transmission parameter for a transmission to the radio communication device.

22. The radio communication station as claimed in claim 20, wherein the processor is further adapted to employ the identifier to identify the source of a subsequently received signal.

23. The radio communication station as claimed in claim 22, wherein the subsequently received signal is a random access signal.

24. The radio communication station as claimed in claim 20, wherein the plurality of categories of data comprises at least one of signal quality of a received signal, signal quality of a plurality of frequencies or frequency bands, signal quality for a plurality of antennas, a channel transfer function, number of receive antennas available at the radio communication device, an identifier of a selected radio communication station to which the random access transmission is directed a pre-coding matrix number of spatial streams supportable by the radio communication device, location of the radio communication device, angle of a propagation path from the radio communication device to a radio communication station to which the random access transmission is directed angular spread or uncertainty of the angle of a propagation path from the radio communication device to a radio communication station to which the random access transmission is directed, number of previous transmissions of the random access transmission, requested data rate.

25. The radio communication station as claimed in claim 20, wherein the random access transmission includes an indication of the validity of a stored parameter held by the radio communication station and relating to the radio communication device, the radio communication station further comprising a controller adapted to, in response to the indication, control subsequent communication with the radio communication device dependent on the stored parameter.

26. The radio communication station as claimed in claim 25, wherein the controller is adapted to derive the transmission parameter dependent on the stored parameter.

27. The radio communication station as claimed in claim 25, wherein the stored parameter comprises at least one of: a further identifier; a radio transmission or reception capability; a supported application; a supported data rate; a number of antennas; a quality of service level; a latency requirement; a resource allocation requirement.

28. A radio communication system comprising:
   a radio communication station including
      a receiver adapted to receive from a radio communication device a random access signal indicative of an identifier linked to at least one category of a plurality of categories of data to be received, the identifier is assumed by a radio communication device transmitting the signal; and
      a processor adapted to derive the identifier linked to the at least one category of data, and to include an indication of the identifier in a subsequent transmission from the radio communication station to identify the destination of transmission, and from the radio communication device to identify the source of transmission.

* * * * *